United States Patent
Ji et al.

(10) Patent No.: US 8,136,160 B2
(45) Date of Patent: Mar. 13, 2012

(54) SYSTEM AND METHOD TO SELECT MONITORS THAT DETECT PREFIX HIJACKING EVENTS

(75) Inventors: Lusheng Ji, Randolph, NJ (US); Dan Pei, Jersey City, NJ (US); Tongqing Qiu, Atlanta, GA (US); Jia Wang, Randolph, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 492 days.

(21) Appl. No.: 12/277,855

(22) Filed: Nov. 25, 2008

(65) Prior Publication Data
US 2010/0132039 A1   May 27, 2010

(51) Int. Cl.
*G06F 21/00* (2006.01)
(52) U.S. Cl. .......................................... 726/23
(58) Field of Classification Search ............... 726/22–25
See application file for complete search history.

(56) References Cited

U.S. PATENT DOCUMENTS

| | | | |
|---|---|---|---|
| 7,839,850 B2* | 11/2010 | Kompella | 370/390 |
| 2002/0078202 A1* | 6/2002 | Ando et al. | 709/225 |
| 2003/0115340 A1* | 6/2003 | Sagula et al. | 709/228 |

* cited by examiner

*Primary Examiner* — Vivek Srivastava
*Assistant Examiner* — Anthony Brown
(74) *Attorney, Agent, or Firm* — Hoffman & Baron, LLP

(57) ABSTRACT

Method, system and computer-readable medium to select monitors that increase the likelihood of detecting prefix hijacking events of a destination prefix are disclosed. The method includes assigning each of the candidate prefix hijack monitors to a respective cluster of a plurality of clusters. Each of the candidate prefix hijack monitors is associated with an autonomous system (AS) that indicates an AS path of autonomous systems (ASes) from the AS to a destination prefix associated with a destination AS. The method further includes iteratively merging a pair of clusters with a highest similarity score amongst cluster pairs of the plurality of clusters into a single cluster until a processed number of clusters is less than or equal to a predetermined number of clusters. The method also includes ranking each candidate prefix hijack monitor of each of the processed number of clusters according to a route type from an AS associated with the candidate prefix hijack monitor and an AS distance from the AS associated with the candidate prefix hijack monitor to the destination AS. Yet further, the method includes determining a highest ranked candidate prefix hijack monitor of each of the processed number of clusters.

15 Claims, 6 Drawing Sheets

| Sender AS | Destination Prefix | Distance | AS-Level Path |
|---|---|---|---|
| SAS67 | 135.207.122/24 | 1 | 67, 134 |

| Sender AS | Destination Prefix | Distance | AS-Level Path |
|---|---|---|---|
| SAS51 | 135.207.122/24 | 2 | 51, 67, 134 |

| Sender AS | Destination Prefix | Distance | AS-Level Path |
|---|---|---|---|
| SAS1257 | 135.207.122/24 | 3 | 1257, 51, 67, 134 |

| Sender AS | Destination Prefix | Distance | AS-Level Path |
|---|---|---|---|
| SAS1258 | 135.207.122/24 | 3 | 1258, 51, 67, 134 |

| Sender AS | Destination Prefix | Distance | AS-Level Path |
|---|---|---|---|
| SAS93 | 135.207.122/24 | 1 | 93, 134 |

| Sender AS | Destination Prefix | Distance | AS-Level Path |
|---|---|---|---|
| SAS1257 | 135.207.122/24 | 2 | 1257, 93, 134 |

SYSTEM AND METHOD TO SELECT MONITORS THAT DETECT PREFIX HIJACKING EVENTS

TECHNICAL FIELD

The present application relates generally to network security threats. More specifically, the present application is directed to a system, method and computer storage medium to select monitors that increase the likelihood of detecting prefix hijacking events of a destination prefix on a network, such as the Internet.

BACKGROUND

Prefix hijacking refers to a misconfigured or a malicious border gateway protocol (BGP) router that originates or announces a route to an Internet Protocol (IP) prefix (e.g., a destination prefix) that it does not own. This is becoming an increasingly serious Internet security thereat.

On a network, such as the Internet, IP packets are routed based on destination IP addresses. Routing tables of BGP routers are also organized based on the destination IP addresses. For scalability, plural destination IP addresses may be represented collectively by an IP destination prefix and routes stored in the BGP routers' routing tables are indexed based on the IP destination prefix. The IP destination prefix indicates an address portion common to the plural destination IP addresses (e.g., destination prefix) and a number of bits associated with the destination prefix. For example, a destination prefix of 168.205.122/24 indicates that a first 24 bits are common to destination IP addresses represented by the destination prefix (e.g., 10101000 11001101 01111010 in binary or 168.205.122 in hexadecimal). The example destination prefix may represent destination IP addresses from 168.205.122.0 to 168.205.122.255.

On the Internet, one or more subnet networks that are under control of an independently administered domain constitute an autonomous system (AS), which is identified via a unique numerical ID (e.g., AS ID) assigned to it by its regional Internet registry. The AS includes one or more BGP routers to facilitate inter-domain routing, e.g. routing of IP traffic to and from neighboring ASes. The AS ID is associated with one or more IP destination prefixes that the AS owns.

The Internet includes tens of thousands of autonomous systems (ASes). ASes establish neighboring relationships, employing BGP to maintain and exchange inter-domain routing information (or routing announcements). BGP operates based on the assumption that there is implicit trust among the ASes. As a result, inter-domain routing between ASes is incapable of preventing a BGP router of a malicious AS from announcing a route to a destination prefix using a fabricated AS path (e.g., false announcement). Such a false announcement may cascade quickly to a large number of BGP routers across multiple ASes and pollute their associated routing tables.

Based on the false announcements, the entries in the routing tables may be updated by the BGP routers for the destination prefix because the BGP router's malicious AS appears to be a very attractive next hop for forwarding traffic towards that destination prefix, resulting in hijacking of the destination prefix. Thus, IP traffic from certain parts of the Internet destined to the destination prefix may be affected. For example, the malicious AS may drop all IP traffic addressed to the destination prefix to effectively cause a denial of service attack against the destination prefix. The malicious AS may also redirect IP traffic to an alternate destination prefix that may operate as a phishing attack. Other types of attacks are also possible by hijacking the destination prefix. As a result, one or more networks of a domain identified by the hijacked destination prefix may experience performance degradation, service outage, and/or a serious security breach.

Destination prefix monitors may be disposed at certain ASes on the Internet to determine routes of IP traffic from the monitors to a destination prefix across the Internet using a traceroute program. Disposing a multiplicity of destination prefix monitors amongst the ASes does not by itself improve the likelihood of detecting a hijack of the destination prefix and inexorably increases the collection and reporting of traceroute information. It would be desirable to select plural destination prefix monitors that increase the likelihood of detecting prefix hijacking events of the destination prefix.

SUMMARY

In accordance with a particular embodiment, a method for selecting candidate prefix hijack monitors is disclosed. The method includes assigning each of the candidate prefix hijack monitors to a respective cluster of a plurality of clusters. Each of the candidate prefix hijack monitors is associated with an autonomous system (AS) that indicates an AS path of autonomous systems (ASes) from the AS to a destination prefix associated with a destination AS. The method further includes iteratively merging a pair of clusters with a highest similarity score amongst cluster pairs of the plurality of clusters into a single cluster until a processed number of clusters is less than or equal to a predetermined number of clusters. The method also includes ranking each candidate prefix hijack monitor of each of the processed number of clusters according to a route type from an AS associated with the candidate prefix hijack monitor and an AS distance from the AS associated with the candidate prefix hijack monitor to the destination AS. Yet further, the method includes determining a highest ranked candidate prefix hijack monitor of each of the processed number of clusters.

In accordance with another embodiment, a monitor selection system to select candidate prefix hijack monitors is disclosed. The system includes a cluster, a rank module, and a determination module. The cluster module configured to assign each of the candidate prefix hijack monitors to a respective cluster of a plurality of clusters. Each of the candidate prefix hijack monitors is associated with an autonomous system (AS) that indicates an AS path of autonomous systems (ASes) from the AS to a destination prefix associated with a destination AS. The cluster module is further configured to iteratively merge a pair of clusters with a highest similarity score amongst cluster pairs of the plurality of clusters into a single cluster until a processed number of clusters is less than or equal to a predetermined number of clusters. The rank module is configured to rank each candidate prefix hijack monitor of each of the processed number of clusters according to a route type from an AS associated with the candidate prefix hijack monitor and an AS distance from the AS associated with the candidate prefix hijack monitor to the destination AS. The determination module is configured to determine a highest ranked candidate prefix hijack monitor of each of the processed number of clusters.

In accordance with a further embodiment, a computer-readable storage medium that includes operational instructions for selecting candidate prefix hijack monitors is disclosed. The medium includes instructions that, when executed by a processor, cause the processor to assign each of the candidate prefix hijack monitors to a respective cluster of a plurality of clusters, each of the candidate prefix hijack monitors associated with an autonomous system (AS) that indicates an AS path of autonomous systems (ASes) from the AS to a destination prefix associated with a destination AS. The medium further includes instructions that, when executed by a processor, cause the processor to iteratively merge a pair of clusters with a highest similarity score amongst cluster pairs of the plurality of clusters into a single cluster until a processed number of clusters is less than or equal to a predetermined number of clusters. The medium also includes instructions that, when executed by a processor, cause the processor to rank each candidate prefix hijack monitor of each of the processed number of clusters according to a route type from an AS associated with the candidate prefix hijack monitor and an AS distance from the AS associated with the candidate prefix hijack monitor to the destination AS. Yet further, the medium includes instructions that, when executed by a processor, cause the processor to determine a highest ranked candidate prefix hijack monitor of each of the processed number of clusters.

BRIEF DESCRIPTION OF THE DRAWINGS

Some embodiments are illustrated by way of example and not limitation in the figures of the accompanying drawings in which:

FIG. 1 is a block diagram of an example distribution topology that distributes IP traffic from a source autonomous system (AS) to a destination AS over a transmission network before hijacking of a destination prefix of the destination AS;

FIG. 4 is a block diagram of an example distribution topology that distributes IP traffic from a source AS to a destination AS over a transmission network of FIG. 1 after a hijacking of a destination prefix of the destination AS;

DETAILED DESCRIPTION

System, method and computer-readable storage medium to select monitors that increase the likelihood of detecting prefix hijacking events of a destination prefix are disclosed. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
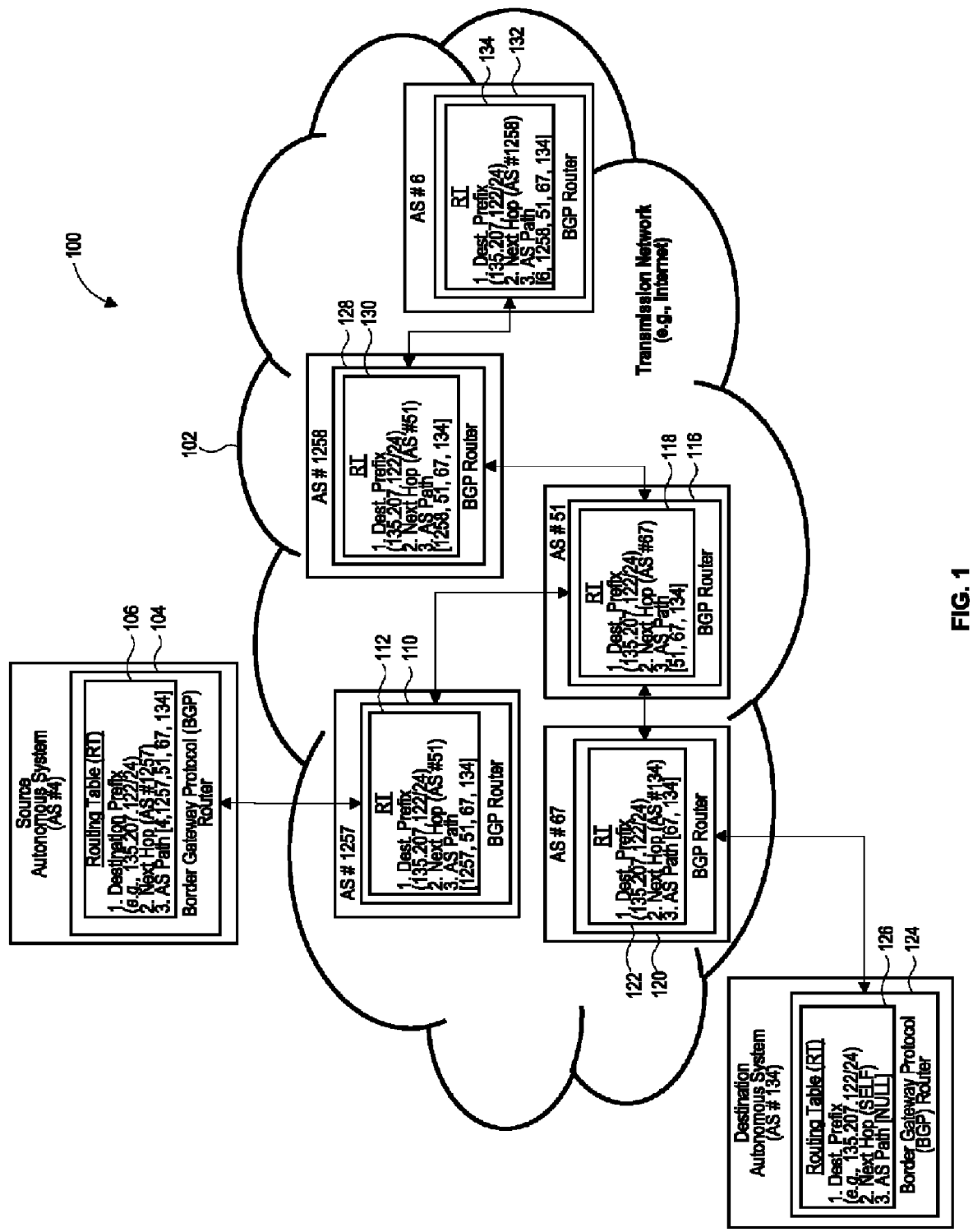

FIG. 1 is a block diagram of an example distribution topology 100 that distributes IP traffic from a source autonomous system (AS) #4 to a destination AS #134 over a transmission network 102 before hijacking of a destination prefix (e.g., 135.207.122/24) of the destination AS #134. The transmission network 102 may be the Internet. While the example distribution topology 100 illustrates seven ASes #4, #6, #51, #67, #134, #1257 and #1258 for brevity, clarity and to aid understating, it is understood that the distribution topology 100 may include substantially more ASes that may be disposed in a substantially different topology. The illustrated ASes #4, #6, #51, #67, #134, #1257 and #1258 depict AS paths to the destination prefix of the destination AS #134 (e.g., 135.207.122/24). For clarity and brevity purposes, the description below does not differentiate between an entity that may be included in an AS and the AS itself. For example, the description does not differentiate a destination prefix (e.g., 135.207.122/24) and the destination AS (e.g., AS #134) of the destination prefix. As another example, the description does not differentiate a candidate prefix hijack monitor and an AS in which the candidate prefix hijack monitor is disposed.

The example topology of FIG. 1 illustrates that each of the ASes includes a border gateway protocol (BGP) router that is configured to communicate with its neighboring ASes to transmit IP traffic, including announcement messages, to the destination prefix (e.g., 135.207.122/24) of destination AS #134, as will be described below. The BGP router of each AS includes a routing table (RT), which includes a destination prefix (e.g., 135.207.122/24) of the destination AS #134, a next hop AS and an AS path from the AS to the destination AS #134.

In the example distribution topology 100 of FIG. 1, the destination AS #134 that is associated with the destination prefix (e.g., 135.207.122/24) includes a BGP router 124. The BGP router 124 includes a routing table (RT) 126, which the BGP router 124 uses to route IP traffic to the transmission network 102. Because the destination prefix is part of the destination AS #134, RT 126 points to an internal route to reach the destination prefix (e.g., 135.207.122/24). The BGP router 124 of destination AS #134 includes the prefix 135.207.122/24 in its update messages to its neighbor ASes (e.g., AS#67). In response to receiving a message from destination AS #134, BGP router 120 of AS #67 updates its RT 122 to include an entry for the destination prefix (e.g., 135.207.122/24) of the destination AS #134. The BGP router 120 of AS #67 associates with the destination prefix (e.g., 135.207.122/24), a next-hop AS to the destination prefix (135.207.122/24) of destination AS #134 and an AS path to the destination AS #134 (e.g., AS Path=[#67, #134]). As set forth in the RT 122 of BGP router 120 of AS #67, AS #67 is one hop away from the destination AS #134.

Figures 2, 3A, 3B, 3C, 3D:
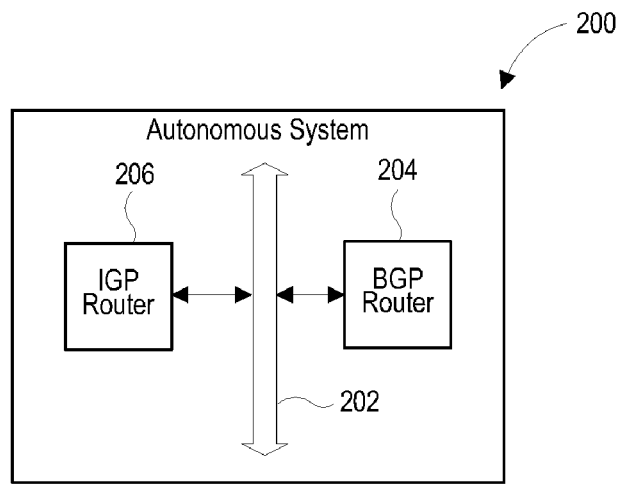
FIG. 2 is an example autonomous system (AS) in accordance with FIG. 1.
FIGS. 3A-3D are example announcement messages generated and distributed by autonomous system (ASes) of FIG. 1.

Contemporaneously with or after updating RT 122, BGP router 120 of AS #67 generates and distributes an announcement message to its neighbor ASes (e.g., AS #51) to announce its AS path to the destination prefix (135.207.122/24) of the destination AS (e.g., destination AS #134). An example announcement message 300a of BGP router 120 is depicted in FIG. 3A and is described in more detail below. In the example distribution topology 100 of FIG. 1, AS #51 is the only neighbor AS of AS #67. In response to receiving the announcement message 300a from BGP router 120 of AS #67, BGP router 116 of AS #51 updates its RT 118 to include an entry for the destination prefix (e.g. 135.207.122/24) of the destination AS #134. BGP router 116 of AS #51 associates with the destination prefix (e.g., 135.207.122/24), a next-hop AS to the destination prefix (e.g., 135.207.122/24) of the destination AS #134 (e.g., AS #67) and an AS path to the destination AS #134 (e.g., AS Path=[#51, #67, #134]). As set forth in the RT 118 of BGP router 116 of AS #51, AS #51 is two hops away from the destination AS #134.

Similarly, contemporaneously with or after updating RT 118, BGP router 116 of AS #51 generates and distributes an announcement message to its neighbor ASes (e.g., ASes #1257 and #1258) to announce its AS path to the destination prefix (e.g., 135.207.122/24) of the destination AS (e.g., destination AS #134). An example announcement message 300b of BGP router 116 is depicted in FIG. 3B and is described in more detail below. In response to receiving the announcement message 300b from BGP router 116 of AS #51, BGP routers 110, 128 of ASes #1257 and #1258, respectively, update their respective RTs 112, 130 to include an entry for the destination prefix (e.g., 135.207.122/24) of the destination AS #134. The BGP routers 110, 128 of respective ASes #1257, #1258 associate with the destination prefix (e.g., 135.207.122/24), a next-hop AS to the destination prefix (e.g., 135.207.122/24) of AS #134 (e.g., AS #51) and an AS path to the destination AS #134. For example, the AS path in RT 112 is set to [#1257, #51, #67, #134] and the AS path in RT 130 is set to [#1257, #51, #67, #134]. As set forth in RTs 112, 130, ASes #1257 and #1258 are three hops away from the destination AS #134.

Further, contemporaneously with or after updating RT 112, BGP router 110 of AS #1257 generates and distributes an announcement message to its neighbor ASes (e.g., AS #4) to announce its AS path to the destination prefix (e.g., 135.207.122/24) of the destination AS (e.g., destination AS #134). An example announcement message 300c of BGP router 110 is depicted in FIG. 3C and is described in more detail below. In the example distribution topology 100 of FIG. 1, AS #4 is the only neighbor of AS #1257. In response to receiving the announcement message 300c from BGP router 120 of AS #67, BGP router 104 of AS #4 updates its RT 106 to include an entry for the destination prefix (e.g., 135.207.122/24) of the destination AS #134. BGP router 104 of AS #4 associates with the destination prefix (e.g., 135.207.122/24), a next-hop AS to the destination prefix (e.g., 135.207.122/24) of the destination AS #134 (e.g., AS #1257) and an AS path to the destination AS #134 (e.g., AS Path=[#4, #1257, #51, #67, #134]). As set forth in the RT 106 of BGP router 104 of AS #4, AS #4 is four hops away from the destination AS #134.

Still further, contemporaneously with or after updating RT 130, BGP router 128 of AS #1258 generates and distributes an announcement message to its neighbor ASes (e.g., AS #6) to announce its AS path to the destination prefix (e.g., 135.207.122/24) of the destination AS (e.g., destination AS #134). An example announcement message 300d of BGP router 128 is depicted in FIG. 3D and is described in more detail below. In the example topology 100 of FIG. 1, AS #6 is the only neighbor AS of AS #1258. In response to receiving the announcement message 300d from BGP router 128 of AS #1258, BGP router 132 of AS #6 updates its RT 134 to include an entry for the destination prefix (e.g., 135.207.122/24) of the destination AS #134. BGP router 132 of AS #6 associates with the destination prefix (e.g., 135.207.122/24), a next-hop AS to the destination prefix (e.g., 135.207.122/24) of the destination AS #134 (e.g., AS #1258) and an AS path to the destination AS #134 (e.g., AS Path=[#6, #1258, #51, #67, #134]). As set forth in the RT 134 of BGP router 132 of AS #6, AS #6 is four hops away from the destination AS #134.

FIG. 2 is an example autonomous system (AS) 200 in accordance with FIG. 1. AS 200 includes at least one intra-domain network 202 that interconnects at least one BGP router 204 and at least one interior gateway protocol (IGP) router. The at least one BGP router 204 is configured to maintain and exchange inter-domain routing information with neighboring ASes to facilitate routing of IP traffic to and from the neighboring ASes (shown in example topology 100 of FIG. 1). The at least one (IGP) router 206 is configured to facilitate intra-domain routing of IP traffic via the at least one intra-domain network 202, where plural intra-domain networks are provided.

FIGS. 3A-3D are example announcement messages generated and distributed by ASes of FIG. 1. More specifically, an announcement message includes a sender AS (SAS), a destination prefix of a destination AS, an AS-hop distance to the destination AS and an AS path. It is noted that SAS and AS-hop distance values may be omitted from the announcement messages as these values may be determined from the AS path. However, for clarity of the description, these values are shown in FIGS. 3A-3D. Announcement message 300a includes a sender AS of SAS #67, a destination prefix (e.g., 135.207.122/24) of a destination AS #134, a distance to the destination AS #134 of 1 hop, and an AS path to the destination AS #134 of ASes #67 and #134. Announcement message 300b includes an sender AS of SAS #51, a destination prefix (e.g., 135.207.122/24) of a destination AS #134, a distance to destination AS #134 of 2 hops, and an AS path to the destination AS #134 of ASes #51, AS #67 and #134. Announcement message 300c includes an sender AS of SAS #1257, a destination prefix (e.g., 135.207.122/24) of a destination AS #134, a distance to destination AS #134 of 3 hops, and an AS path to the destination ASes #134 of ASes #1257, #51, #67 and #134. Announcement message 300d includes an sender AS of SAS #1258, a destination prefix (e.g., 135.207.122/24) of a destination AS #134, a distance to destination AS #134 of 3 hops, and an AS path to the destination ASes #1258, #51, #67 and #134.

Figure 4:
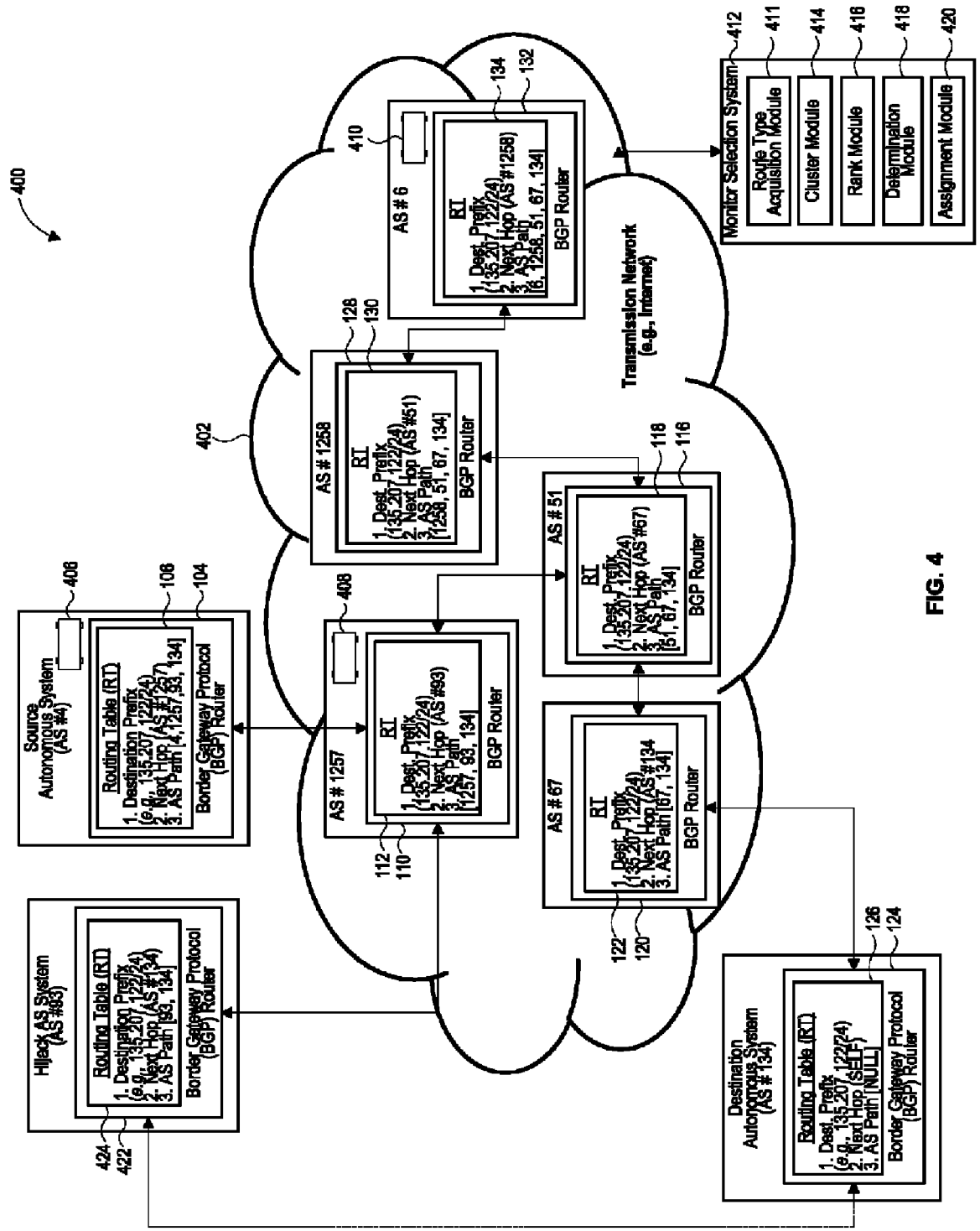
Figures 5, 6A, 6B:
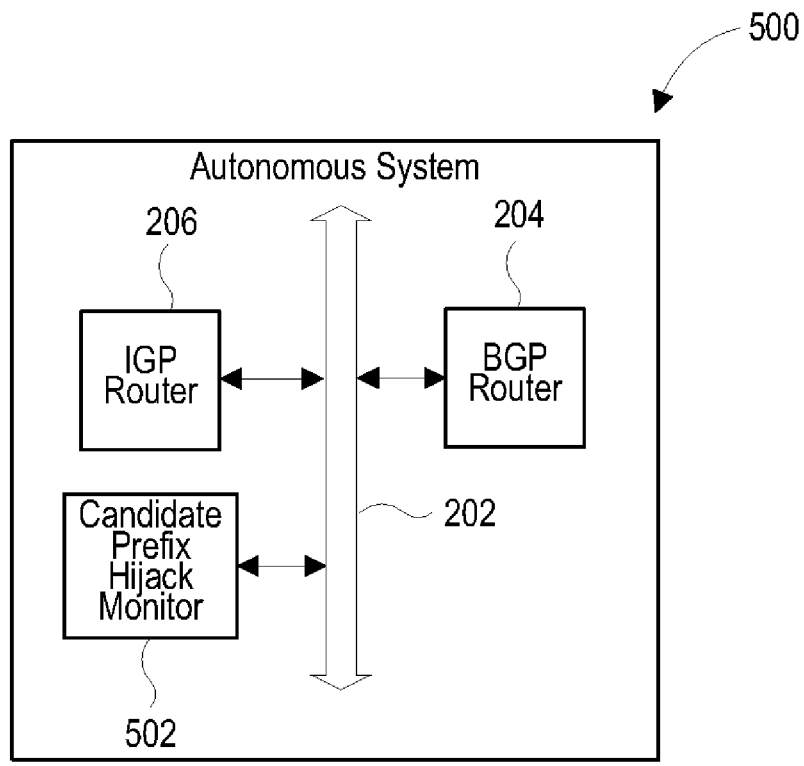
FIG. 5 is an example autonomous system (AS) in accordance with FIG. 4.
FIGS. 6A AND 6B are example announcement messages generated and distributed by ASes of FIG. 4.

FIG. 4 is a block diagram of an example distribution topology 400 that distributes IP traffic from a source autonomous system (AS) #4 to a destination AS #134 over a transmission network 402 after a hijacking of a destination prefix of the destination AS #134. As illustrated in the distribution topology 400, a hijacker AS system #93 may maliciously hijack the destination prefix of the destination AS #134. The hijacker AS #93 includes a BGP router 422. The BGP router 422 includes a routing table (RT) 424, which the BGP router 422 uses to route IP traffic to and from the transmission network 402. To hijack the destination prefix of destination AS #134, the BGP router 422 of the hijacker AS #93 generates and distributes an announcement message to it neighbor AS #1257, announcing a fake AS path to the destination AS (e.g., destination AS #134). The BGP router 422 of the hijacker AS #93 sets the fake path to the destination prefix (e.g., 135.207.122/24) of the destination AS #134 to be, for example, the shortest possible or one hop AS path (e.g. AS path=#93, #134). An example announcement message 600a of BGP router 422 is depicted in FIG. 6A and is described in more detail below.

In response to receiving the announcement message 600a from BGP router 422 of AS #93, BGP router 110 of AS #1257 determines whether the announced AS path (e.g., AS path= [#93, #134]) to the destination prefix (e.g., 135.207.122/24) of the destination AS #134 is a better AS path than a current AS path (e.g., AS path=[#1257, #51, #67 #134]), as particularly shown in FIG. 1. A criterion that may be used to determine whether an AS path is better may be whether an AS path is a shorter based on a number of AS hops in the AS path. Alternate or additional criteria may be employed to determine whether an AS path is better. In this example, the AS path announced by AS #93 is a better AS path because it is shorter. Based on this determination, BGP router 110 of AS #1257 updates its RT 112 to update the next hop and the AS path for its entry of the destination prefix (e.g. 135.207.122/24) of the destination AS #134. Therefore, BGP router 110 of AS #1257 updates for the destination prefix (e.g., 135.207.122/24), the next hop to AS #134 (e.g., AS #93), and an AS path to AS #134 (e.g., AS Path=[#1257, #93, #134]). As set forth in the RT 112 of BGP router 110 of AS #1257, AS #1257 is two hops away from destination AS #134.

Contemporaneously with or after updating RT 112, BGP router 110 of AS #1257 generates and distributes an announcement message to its neighbor ASes (e.g., ASes #4 and #1258) to announce its new AS path to the destination prefix (e.g., 135.207.122/24) of the destination AS (e.g., destination AS #134). An example announcement message 600b of BGP router 110 is depicted in FIG. 6B and is described in more detail below. In response to receiving the announcement message 600b from BGP router 110 of AS #1257, BGP router 104 of AS #4 determines whether the announced AS path (e.g. AS path=[#1257, #93, #134]) to the destination prefix (e.g., 135.207.122/24) of the destination AS #134 is a better AS path than a current AS path (e.g., AS path=[#4, #1257, #51, #67 #134]), as particularly shown in FIG. 1. In this example, the AS path announced by AS #1257 is better (e.g., shorter). As aforementioned, different criteria may be used to determine whether an AS path is better than another AS path. Based on this determination, BGP router 104 of AS #4 updates its RT 106 to update the next hop and the AS path for its entry of the destination prefix (e.g., 135.207.122/24) of destination AS #134. Therefore, BGP router 104 of AS #4 updates for the destination prefix (e.g., 135.207.122/24), the next hop to AS #134 (e.g., AS #1257), and an AS path to AS #134 (e.g., AS Path=[#4, #1257, #93, #134]). As set forth in the RT 106 of BGP router 104 of AS #4, AS #4 is three hops away from destination AS #134.

Also, in response to receiving the announcement message 600b from BGP router 110 of AS #1257, BGP router 116 of AS #51 determines whether the announced AS path (e.g., AS path=[#1257, #93, #134]) to the destination prefix (e.g., 135.207.122/24) of the destination AS #134 is a better AS path than a current AS path (e.g., AS path=[#51, #67, #134]), as particularly shown in FIG. 1. In this example, the AS path announced by AS #1257 is a worse AS path because it is a longer AS path. Consequently, BGP router 116 of AS #51 does not update its next hop and AS path for the destination prefix (e.g., 135.207.122/24) of the destination AS #134. As set forth in the RT 118 of BGP router 116 of AS #51, AS #51 remains 2 hops away from destination AS #134. Because BGP router 116 of AS #51 has determined not to update its next hop and AS path for the destination prefix (e.g. 135.207.122/24), it does not generate any further announcements to its peer ASes #67 and #1258 for the destination prefix. Consequently, the next hops and AS paths of ASes #67 and #1258, as well as AS #6 which is a neighbor of AS #1258, remain unchanged.

To monitor for the possible hijacking of a destination prefix (e.g., 135.207.122/24) of a destination AS (e.g., destination AS #134), a set of candidate prefix hijack monitors may be disposed at certain ASes on the transmission network 402 to determine routes of IP traffic from the candidate prefix hijack monitors to the destination prefix of the destination AS across the network 402 (e.g. Internet), using a traceroute program. For example, the set of candidate prefix hijack monitors may include candidate prefix hijack monitors 406, 408 and 410, which may be disposed at ASes #4, #1257 and #6, respectively. It should be noted that the number of candidate hijack monitors in the set of candidate prefix hijack monitors may be substantially larger based on the number of ASes in network 402.

The distribution topology 400 includes a monitor selection system 412 that is configured to select a desired number of prefix hijack monitors from the set of candidate prefix hijack monitors that are most likely to detect a prefix hijack event of the destination prefix of the destination AS #134. The monitor selection system includes a route type acquisition module 411, a cluster module 414, a rank module 416, a determination module 418 and an assignment module 420.

The route type acquisition module 411 is configured to acquire a route type associated with an AS. The route type may be a provider, peer or customer route. The route type acquisition module 411 may acquire the route type associated with an AS by querying a regional Internet registry with which the AS is registered, querying the AS for its route type, or defaulting to a route type based on a number of neighbors of the AS. As an example, if the number of neighbors of an AS is fewer than 1000, the default route type may be a customer route. As another example, if the number of neighbors of an AS is greater than 1000, the default route type may be a provider route.

The cluster module 414 is configured to cluster the candidate prefix hijack monitors from the set of candidate hijack monitors into a predetermined or desired number of clusters. Each cluster will include one or more of the candidate prefix hijack monitors with similar AS paths to the destination prefix of the destination AS #134. Although a cluster may include only one candidate prefix hijack monitor if the desired number of clusters has been reached, in most instances, each cluster will include a plurality of candidate prefix hijack monitors that have similar AS to the destination prefix of the destination AS #134.

As will be described in greater detail with reference to FIG. 7 below, the desired number for prefix hijack monitors will be selected from the desired number of clusters. In the topology of FIG. 4, the number of desired clusters may be set to 2 clusters. The first cluster one may include candidate prefix hijack monitors 406 and 408 and the second cluster may include prefix hijack monitors 410. If additional candidate prefix hijack monitors are provided in FIG. 4, they may be clustered into the first cluster or the second cluster based on how similar their AS paths to the destination prefix of the destination AS #134 are to the candidate prefix hijack monitors of the first cluster or the second cluster.

The rank module 414 is configured to rank each candidate prefix hijack monitor of each cluster according to a type of AS route from an AS associated with that candidate prefix hijack monitor to a next hop AS (e.g. provider route, peer route, customer route) and a distance from the AS to the destination AS (e.g., to destination AS #134). A provider route is highest, a peer route is next highest and the customer route is lowest. This is due to a common practice among Internet service providers in deciding which route type to pick when there are multiple route types available. When an AS has a choice to which neighboring AS to forward IP traffic, it prefers the most to forward data to a neighbor AS that is its customer, e.g. an AS whose route type is that of a customer. This is because IP traffic forwarded over this route generates revenue. However, a neighbor AS whose route type is that of provider to a forwarding AS is a least preferred alternative because forwarding IP traffic to such as AS incurs cost. Therefore, a route through a provider is most likely to be hijacked. A numerical value may be assigned to the candidate prefix hijack monitor to indicate the type of AS route from its associated AS to a next hop AS. For example, the candidate prefix hijack monitor 406 may be assigned a value of 100 to indicate that the AS route form AS #4 to AS #1257 is a customer route (e.g., AS #4 is a customer of AS #1257); the candidate prefix hijack monitor 408 may be assigned a value of 300 to indicate that the AS route form AS #1257 to AS #51 is a provider route (e.g., AS #51 is a provider to As #1257); and the candidate prefix hijack monitor 410 may be assigned a value of 200 to indicate that the AS route form AS #6 to AS #1258 is a peer route (e.g., AS #6 and AS #1258 are peers).

In addition to the route type, distance is also a concern when an AS decides how to forward IP traffic. To the assigned type of route value for each candidate prefix hijack monitor an AS distance value is added. More specifically, the AS distance value is an AS hop distance from the AS associated with each candidate prefix hijack monitor to the destination AS. For example, for the candidate prefix hijack monitor 406 an AS distance value of 4 may be added to its assigned value of 100 for a total value of 104 (e.g., distance value from AS #4 to AS #134); for the candidate prefix hijack monitor 408 an AS distance value of 3 may be added to its assigned value of 300 for a total value of 303 (e.g., distance value from AS #1257 to AS #134); for the candidate prefix hijack monitor 410 an AS distance value of 5 may be added to its assigned value of 200 for a total value of 205 (e.g., distance value from AS #6 to AS #134).

The determination module 418 is configured to determine a highest ranked candidate prefix hijack monitor in each cluster based on its assigned value determined by the rank module 416. The determined highest-ranked candidate prefix hijack monitors of the clusters are the most likely of detecting prefix hijack events of the destination prefix of the destination AS #134. For example, based on the foregoing types or routes and distance values, the highest ranked candidate prefix hijack monitor determined from the first cluster is candidate prefix hijack monitor 408 and the highest ranked candidate prefix hijack monitor determined from the second cluster is candidate prefix hijack monitor 410.

The assignment module 420 may assign or configure only the highest rank candidate prefix hijack monitors (e.g. prefix hijack monitors 408 and 410) determined from the set of candidate prefix hijack monitors (e.g., prefix hijack monitors 406, 408 and 410) to monitor the destination prefix (e.g., 135.207.122/24) of the destination AS (e.g., destination AS #134), as they are likely of detecting prefix hijack events of the destination prefix of the destination AS #134.

FIG. 5 is an example autonomous system (AS) 500 in accordance with FIG. 4. AS 500 includes at least one intra-domain network 202 that interconnects at least one BGP router 204, at least one interior gateway protocol (IGP) router 206, and a candidate prefix hijack monitor 502. The candidate prefix hijack monitor 502 is configured to monitor a destination prefix (e.g., 135.207.122/24) of a destination AS (e.g., AS #134) using a traceroute program, e.g., by generating and transmitting traceroute messages of increasing time-to-live (TTL) value along a path to the destination prefix of the destination AS. The prefix hijacker monitor 502 is able to discover a router-level path towards the destination prefix (e.g., 135.207.122/24) by observing "TTL-reached-0" error messages transmitted back by intermediate routers as they decrement the TTL value of the traceroute messages when forwarding such messages. Such a router-level path is then converted to AS-level path based on which routers belong to which ASes. The candidate prefix hijack monitor 502 transmits traceroute messages to ASes over the transmission network 402 via the intra-domain network 202 and the at least one BGP router 204.

FIGS. 6A AND 6B are example announcement messages generated and distributed by ASes of FIG. 4. Announcement message 600a includes a sender AS of SAS #93, a destination prefix (e.g., 135.207.122/24) of destination AS #134, a distance to destination AS #134 of 1 hop, and a fake AS path to the destination AS #134 of ASes #93 and #134. Announcement message 600b includes a sender AS of SAS #1257, a destination prefix (e.g., 135.207.122/24) of a destination AS #134, a distance to destination AS #134 of 2 hops, and a fake AS path to the destination AS #134 of ASes #1257, #93 and #134. As illustrated, the fake AS paths are announced by ASes #93 and #1257. AS #1257 accepts this fake path received from AS #93 because it is better (e.g. shorter) than AS #1257's previous path to the destination AS #134. After AS #1257 accepts the fake path, it updates its RT 112 to reflect the change of forwarding future IP traffic for the destination prefix (e.g., 135.207.122/24) through AS #93. Concurrently or after the update, AS #1257 includes the new path in its own announcement message 600b announced to its neighbor ASes, (e.g., ASes #4, #51). Although, both AS #4 and AS #51 receive announcement message 600b, only AS #4 updates its RT 106 because of a better (e.g., shorter) AS path to the destination AS #134. AS #51 does not generate an announcement message because it already has a better (e.g., shorter) AS path than the AS path via hijacker AS #93. In this example, no distinction is made amongst provider, peer and customer route types of the ASes. Thus, a decision of which path is better was based on shorter AS hop distance.

Figure 7:
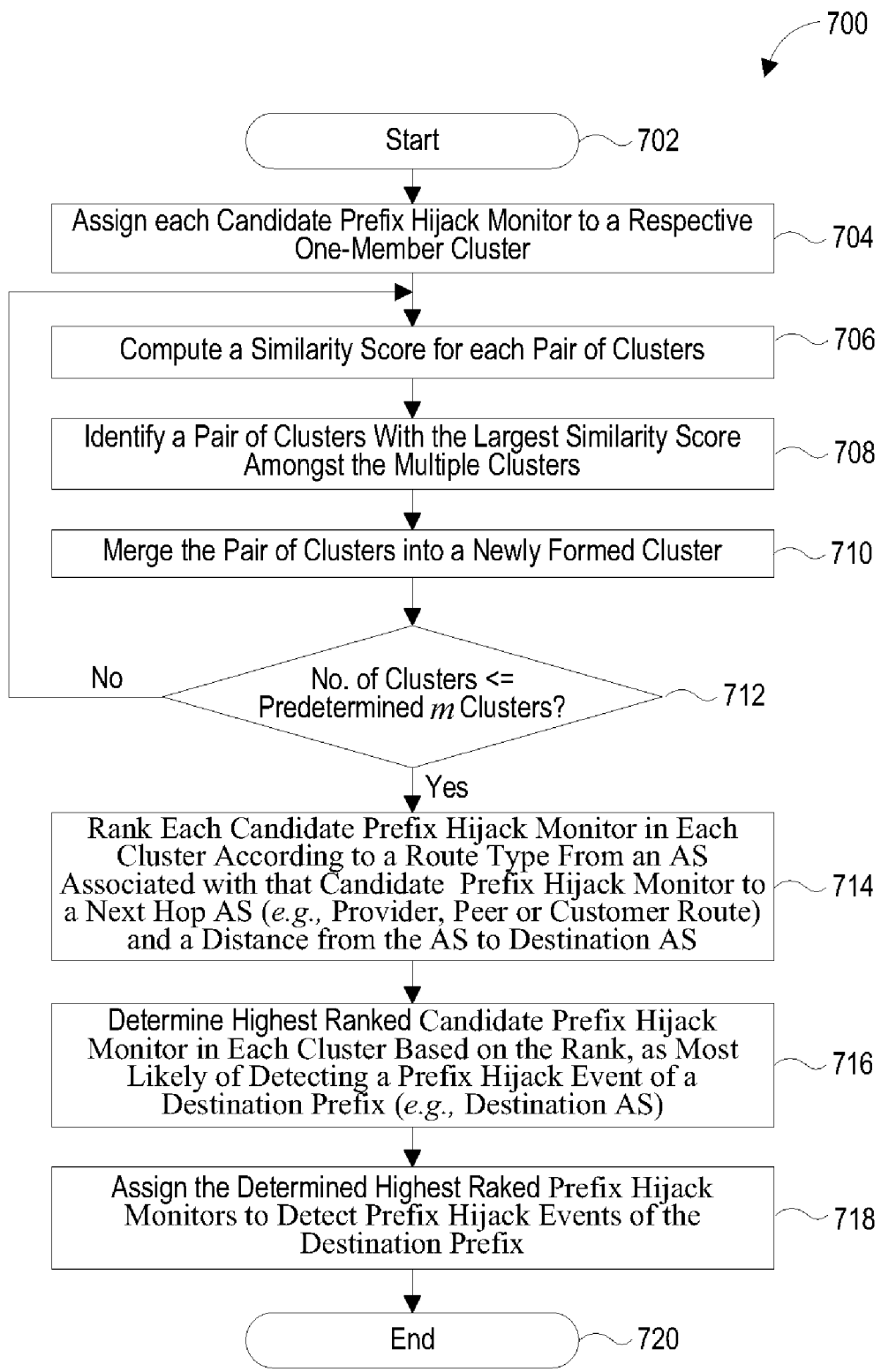
FIG. 7 is a flowchart that illustrates an example method of selecting prefix hijack monitors that increase the likelihood of detecting prefix hijacking events of a destination prefix.

FIG. 7 is a flowchart that illustrates an example method 700 of selecting prefix hijack monitors that increase the likelihood of detecting prefix hijacking events of a destination prefix. The method 700 starts at operation 702. At this point a number of candidate prefix hijack monitors are deployed in a number of ASes on the transmission network 402 of FIG. 4, for example. As an example candidate prefix hijack monitors 406, 408, 410 are deployed in ASes #4, 1257, and #6. The number and locations of where these candidate prefix hijack monitors are deployed are usually determined by factors such as cost and practicality. Because monitoring generates IP traffic overhead and uses computing resources, it is not practical to use all candidate prefix hijack monitors to monitor all destination prefixes. Thus, method 700 is an optimization that selects a pre-determined number of prefix hijack monitors from all candidate prefix hijack monitors to monitor a particular destination prefix (e.g., destination prefix 135.207.122/24 of destination AS #134). At operation 704, each of candidate prefix hijack monitors (e.g., candidate prefix hijack monitors 406, 408, 410) is assigned to a respective one-member cluster. For example, cluster module 414 may assign candidate prefix hijack monitors 406 to cluster 1; candidate prefix hijack monitors 410 to cluster 2; and candidate prefix hijack monitors 408 to cluster 3. At operation 706, a similarity score is computed for each pair of clusters. The similarity score may be based on a similarity of AS paths of ASes associated with the candidate prefix hijack monitors to the destination prefix of the destination AS.

Operations 706-712 are performed until the number of clusters is less than or equal to a predetermined number of clusters (e.g., m<=2). Operations 706-712 may be performed by cluster module 414. At operation 706, a similarity score is computed for each pair of clusters. The similarity score may be based on a similarity of AS paths of ASes associated with the candidate prefix hijack monitors to the destination prefix of the destination AS. The similarity score between two clusters is determined as a largest similarity score among all possible similarity scores between any two member ASes, one from each cluster. Further, the similarity score between two candidate prefix hijack monitors may be computed by inspecting their AS paths, an AS path from each candidate prefix hijack monitor's AS to the destination AS. Particularly, the similarity score may be computed by a number of common ASes (hops) in the two AS paths divided by a length of a shorter AS path (number of hops) to the destination AS amongst the two AS paths. For example, the AS path of AS #4 associated with candidate prefix hijack monitor 406 is [#4, #1257, 93, #134] and the AS path of AS #1257 associated with monitor 408 is [#1257, 93, #134]. These candidate prefix hijack monitors share three (3) common hops (e.g., ASes #1257, 93, #134) and the length of the shorter AS path to the destination AS #134 is three (3) hops. Consequently, the similarity score between candidate prefix hijack monitors 406 and 408 is ⅔ or 1.0. The similarity score between candidate prefix hijack monitors 406 and 410 is ¼ or 0.25. The similarity score between candidate prefix hijack monitors 408 and 410 is ⅓ or 0.33.

At operation 708, a pair of clusters with a largest similarly score are identified amongst the clusters. For example, in the first iteration of 706-712, the similarity scores between any two clusters are: similarity score of (1.0) for clusters 1 and 2 (e.g., similarity score amongst prefix hijack monitors 406 and 408); similarity score of (0.25) for clusters 1 and 3 (e.g., similarity score between prefix hijack monitors 406 and 410); and similarity score of (0.33) for clusters 2 and 3 (e.g., similarity score between prefix hijack monitors 408 and 410). At operation 710, cluster 1 and cluster 2 are merged into one newly-formed cluster (denoted as cluster 1-2) because they have the largest similarity score. Now there are two clusters, clusters 1-2 and 3. Cluster 1 and cluster 2 are no longer included in the subsequent iterations.

At operation 712, a determination is made as to whether the number of clusters is less than or equal to predetermined m clusters (e.g., 2 clusters). If it is determined at operation 712 that the number of cluster is not less not than m clusters, then the method 700 continues to perform operations 706-712 to reduce the number of cluster to less than or equal to m clusters. If it is determined at operation 712 that the number of cluster is less than or equal to m clusters, as is in this example, the method 700 continues at operation 714 below. In this example, only one iteration through operations 706-712 is performed because the number of clusters reaches (e.g., equals) m clusters in one iteration. However, if a next iteration were performed, because the similarity score for clusters that include multiple candidate prefix hijack monitors is computed based on a maximum similarity score from any one of the candidate prefix hijack monitors of a first cluster to any one of the candidate prefix hijack monitors of a second cluster, a similarity score between clusters 1-2 and 3 would be (0.33), which is a similarity score between prefix hijack monitor 408 from cluster 1-2 and prefix hijack monitor 410 from cluster 3.

At operation 714, each candidate prefix hijack monitor in each cluster (e.g., clusters 1-2 and 3) is ranked according to a route type from an AS associated with that candidate prefix hijack monitor to a next hop AS (e.g. provider, peer or customer route) plus a distance from the AS to the destination AS. The rank module 416 may perform operation 714. An example implementation of the route type was described in relation to FIG. 4 above (e.g. provider route=300; peer route=200; and customer route=100).

At operation 716, a highest ranked candidate prefix hijack monitor in each cluster (e.g., clusters 1-2 and 3) is determined based on the ranking, as most likely of detecting a prefix hijack event of the destination prefix 135.207.122/24 of the destination AS #134. For example, candidate prefix hijack monitors 408 and 410 are determined to be highest ranked at operation 716. At operation 718, candidate prefix hijack monitors that are determined to be highest ranked (e.g. candidate prefix hijack monitors 408 and 410) are assigned to detect prefix hijack events of the destination prefix. For example, the assignment module 420 may assign candidate prefix hijack monitors 408 and 410 to monitor the destination prefix 135.207.122/24 of the destination AS #134. The method 700 ends at operation 720.

Figure 8:
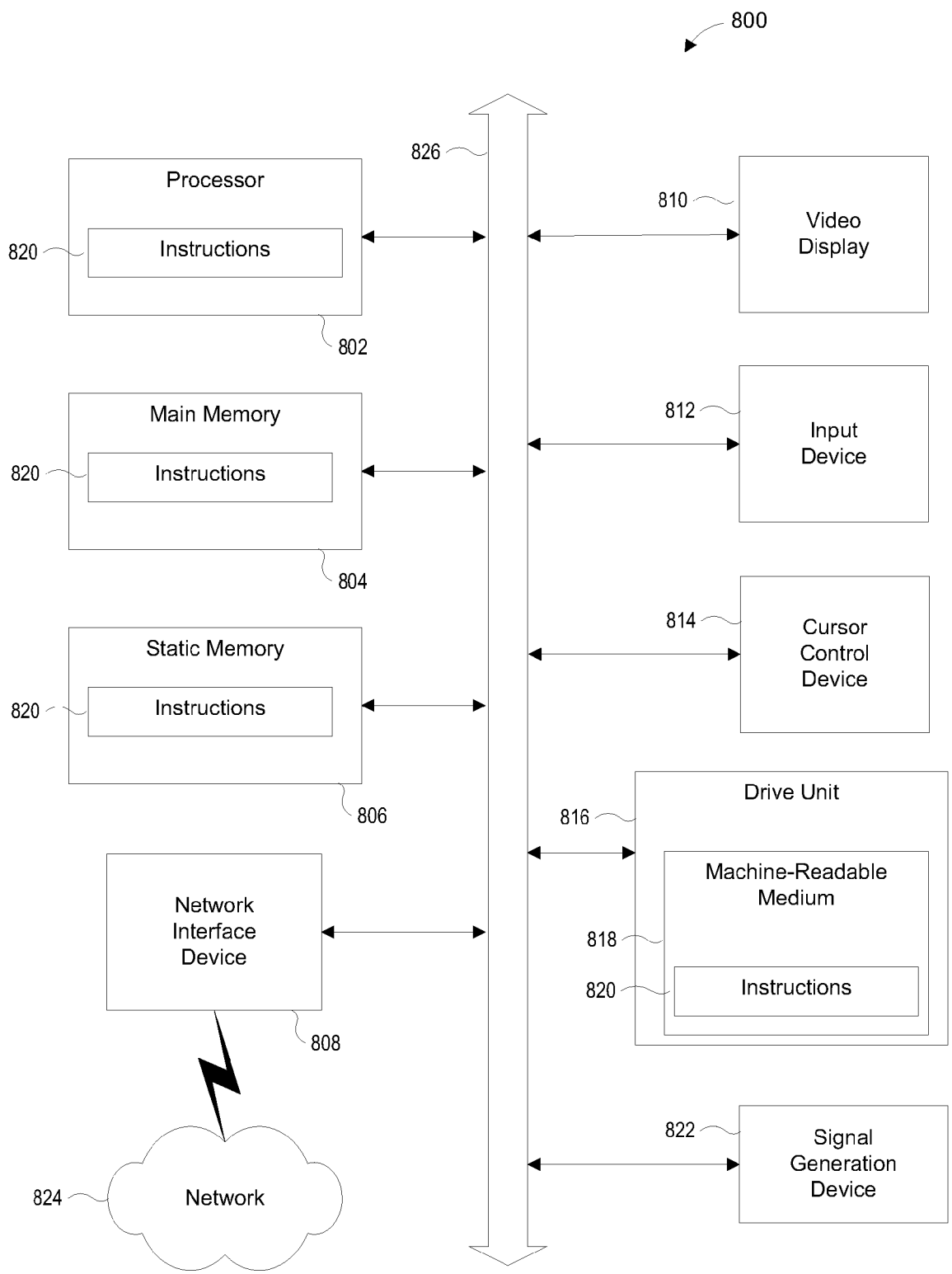
FIG. 8 is a block diagram that illustrates a general computer system.

FIG. 8 is a block diagram that illustrates a general computer system 800. The computer system 800 may include a set of instructions that may be executed to cause the computer system 800 to perform any one or more of the computer based functions or methods disclosed herein. The computer system 800, or any portion thereof, may operate as a standalone device or may be connected, e.g., using a network, to other computer systems or peripheral devices.

In a networked deployment, the computer system 800 may operate in the capacity of a BGP router, an IGP router, a prefix hijack monitor, or a monitor selection system. The computer system 800 may also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g. a central processing unit (CPU), a graphics-processing unit (GPU), or both. Moreover, the computer system 800 may include a main memory 804 and a static memory 806 that may communicate with each other via a bus 826. As shown, the computer system 800 may further include a video display unit 810, such as a liquid crystal display (LCD), an organic light emitting diode (OLED), a projection unit, a television, a flat panel display, a solid state display, or a cathode ray tube (CRT). Additionally, the computer system 800 may include an input device 812, such as a keyboard, and a cursor control device 814, such as a mouse. The computer system 800 may also include a disk drive unit 816, a signal generation device 822, such as a speaker or remote control, and a network interface device 808.

In a particular embodiment, as depicted in FIG. 8, the disk drive unit 816 may include a computer-readable medium 818 in which one or more sets of instructions 820, e.g., software, may be embedded. Further, the instructions 820 may embody one or more of the methods or logic as described herein. In a particular embodiment, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 820 or receives and executes instructions 820 responsive to a propagated signal, so that a device connected to a network 824 may communicate voice, video or data over the network 824. Further, the instructions 820 may be transmitted or received over the network 824 via the network interface device 808.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system, method and computer-readable storage medium to select monitors that increase the likelihood of detecting prefix hijacking events of a destination prefix on a network have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept. Thus, although specific embodiments have been illustrated and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. §1.72(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

The invention claimed is:

1. A method for selecting candidate prefix hijack monitors, the method comprising:
assigning each of the candidate prefix hijack monitors to a respective cluster of a plurality of clusters, each of the candidate prefix hijack monitors associated with an autonomous system (AS) that indicates an AS path of autonomous systems (ASes) from the AS to a destination prefix associated with a destination AS;
iteratively merging a pair of clusters with a highest similarity score amongst cluster pairs of the plurality of clusters into a single cluster until a processed number of clusters is less than or equal to a predetermined number of clusters;
ranking each candidate prefix hijack monitor of each of the processed number of clusters according to a route type from an AS associated with the candidate prefix hijack monitor and an AS distance from the AS associated with the candidate prefix hijack monitor to the destination AS; and
determining a highest ranked candidate prefix hijack monitor of each of the processed number of clusters.

2. The method for selecting candidate prefix hijack monitors of claim 1, wherein the method further includes computing a similarity score of a first AS path from a first AS associated with a first prefix hijack monitor in a first cluster and a second AS path from a second AS associated with a second prefix hijack monitor in a second cluster.

3. The method for selecting candidate prefix hijack monitors of claim 2, wherein the method further includes:
merging one or more ASes associated with prefix hijack monitors of the second cluster into the first cluster; and
deleting the second cluster.

4. The method for selecting candidate prefix hijack monitors of claim 2, wherein computing the similarity score includes dividing a number of common ASes of the first AS path and the second AS path by a length of a shorter of the first AS path and the second AS path.

5. The method for selecting candidate prefix hijack monitors of claim 1, assigning the determined highest ranked candidate prefix hijack monitor of each of the processed number of clusters to detect prefix hijack events of the destination prefix associated with the destination AS.

6. A monitor selection system to select candidate prefix hijack monitors, the system comprising a computing device configured to execute modules comprising:
   a cluster module configured to:
      assign each of the candidate prefix hijack monitors to a respective cluster of a plurality of clusters, each of the candidate prefix hijack monitors associated with an autonomous system (AS) that indicates an AS path of autonomous systems (ASes) from the AS to a destination prefix associated with a destination AS; and
      iteratively merge a pair of clusters with a highest similarity score amongst cluster pairs of the plurality of clusters into a single cluster until a processed number of clusters is less than or equal to a predetermined number of clusters;
   a rank module configured to rank each candidate prefix hijack monitor of each of the processed number of clusters according to a route type from an AS associated with the candidate prefix hijack monitor and an AS distance from the AS associated with the candidate prefix hijack monitor to the destination AS; and
   a determination module configured to determine a highest ranked candidate prefix hijack monitor of each of the processed number of clusters.

7. The monitor selection system of claim 6, wherein the cluster module is further configured to compute a similarity score of a first AS path from a first AS associated with a first prefix hijack monitor in a first cluster and a second AS path from a second AS associated with a second prefix hijack monitor in a second cluster.

8. The monitor selection system of claim 7, wherein the cluster module is further configured to merge one or more ASes associated with prefix hijack monitors of second cluster into the first cluster, and to delete the second cluster.

9. The monitor selection system of claim 7, wherein the cluster module is further configured to divide a number of common ASes of the first AS path and the second AS path by a length of a shorter of the first AS path and the second AS path.

10. The monitor selection system 5, wherein the computing device is further configured to execute an assignment module, the assignment module configured to assign the determined highest ranked candidate prefix hijack monitor of each of the processed number of clusters to detect prefix hijack events of the destination prefix associated with the destination AS.

11. A computer-readable non-transitory storage medium comprising operational instructions for selecting candidate prefix hijack monitors, the instructions, when executed by a processor, cause the processor to:
   assign each of the candidate prefix hijack monitors to a respective cluster of a plurality of clusters, each of the candidate prefix hijack monitors associated with an autonomous system (AS) that indicates an AS path of autonomous systems (ASes) from the AS to a destination prefix associated with a destination AS;
   iteratively merge a pair of clusters with a highest similarity score amongst cluster pairs of the plurality of clusters into a single cluster until a processed number of clusters is less than or equal to a predetermined number of clusters;
   rank each candidate prefix hijack monitor of each of the processed number of clusters according to a route type from an AS associated with the candidate prefix hijack monitor and an AS distance from the AS associated with the candidate prefix hijack monitor to the destination AS; and
   determine highest a ranked candidate prefix hijack monitor of each of the processed number of clusters.

12. The computer-readable storage medium of claim 11, further comprising operational instructions that, when executed by the processor, cause the processor to compute a similarity score of a first AS path from a first AS associated with a first prefix hijack monitor in a first cluster and a second AS path from a second AS associated with a second prefix hijack monitor in a second cluster.

13. The computer-readable storage medium of claim 12, further comprising operational instructions that, when executed by the processor, cause the processor to:
   merge one or more ASes associated with prefix hijack monitors of the second prefix hijack monitor of second cluster into the first cluster; and
   delete the second cluster.

14. The computer-readable storage medium of claim 12, wherein operational instructions to compute the similarity score include operational instructions that, when executed by the processor, cause the processor to divide a number of common ASes of the first AS path and the second AS path by a length of a shorter of the first the AS path and the second AS path.

15. The computer-readable storage medium of claim 11, further comprising operational instructions that, when executed by a processor, cause the processor to assign the determined highest ranked candidate prefix hijack monitor of each of the processed number of clusters to detect prefix hijack events of the destination prefix associated with the destination AS.

* * * * *